(12) United States Patent
Polewarczyk et al.

(10) Patent No.: US 8,678,256 B2
(45) Date of Patent: Mar. 25, 2014

(54) VERTICALLY DEPLOYABLE ROOF RACK SYSTEM

(75) Inventors: Joseph M. Polewarczyk, Rochester Hills, MI (US); Balakrishna Chinta, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 115 days.

(21) Appl. No.: 13/289,042

(22) Filed: Nov. 4, 2011

(65) Prior Publication Data

US 2013/0112724 A1   May 9, 2013

(51) Int. Cl.
*B60R 9/045* (2006.01)

(52) U.S. Cl.
USPC ........................................................ 224/321

(58) Field of Classification Search
USPC ......... 224/769, 317, 319–322, 325–327, 558, 224/316
See application file for complete search history.

(56) References Cited

U.S. PATENT DOCUMENTS

| 3,542,264 | A  | * | 11/1970 | Meyer et al. | 224/42.34 |
| 8,167,179 | B2 | * | 5/2012 | Thomas et al. | 224/321 |
| 2008/0257924 | A1 | * | 10/2008 | Kmita et al. | 224/309 |
| 2008/0290123 | A1 | * | 11/2008 | Sprague | 224/321 |
| 2010/0230452 | A1 | * | 9/2010 | Gerhardt et al. | 224/321 |

* cited by examiner

*Primary Examiner* — Justin Larson
*Assistant Examiner* — Phillip Schmidt
(74) *Attorney, Agent, or Firm* — Quinn Law Group, PLLC

(57) ABSTRACT

A roof rack system includes first and second longitudinal tracks mountable to the roof substantially parallel to one another. The roof rack system includes first and second roof rack assemblies. Each roof rack assembly has a cross member configured to span between the longitudinal tracks. The roof rack assembly has first and second support modules operatively connecting the cross member to the first and second longitudinal tracks, respectively, such that each of the support modules establishes a four bar linkage with the cross member. The roof rack assembly has a biasing member, as well as a locking mechanism that is configured to hold the support modules in a collapsed position, and is releasable to allow the biasing member to urge the support modules to a deployed position in which the cross member is raised above the longitudinal tracks. The for/aft position of the support modules is adjustable.

7 Claims, 5 Drawing Sheets

US 8,678,256 B2

VERTICALLY DEPLOYABLE ROOF RACK SYSTEM

TECHNICAL FIELD

The invention relates to a roof rack system for a vehicle roof.

BACKGROUND

Roof racks are secured to vehicle roofs for supporting cargo above the roof. Roof racks often have longitudinally arranged roof rails, with transverse cross members spanning the distance between the roof rails. The entire roof rack, especially the cross members, must be carefully designed to limit aerodynamic drag.

SUMMARY

A roof rack system for a vehicle roof includes first and second longitudinal tracks mountable to the roof substantially parallel to one another. The roof rack system includes first and second roof rack assemblies. Each roof rack assembly has a cross member configured to span between the longitudinal tracks. The roof rack assembly has first and second support modules operatively connecting the cross member to the first and second longitudinal tracks, respectively, such that each of the support modules establishes a four bar linkage with the cross member. The roof rack assembly has a biasing member, as well as a locking mechanism that is configured to hold the support modules in a collapsed position in which the cross member is substantially flush with the support modules. The locking mechanism is releasable to allow the biasing member to urge the support modules to a deployed position in which the cross member is spaced further above the longitudinal tracks than when in the collapsed position. The support modules are slidable along the longitudinal tracks to adjust a fore-aft position of the cross member when in the deployed position.

Because the cross member is lowered in the collapsed position, wind noise and aerodynamic drag are reduced. Fore/aft adjustment of the cross member via the support module allows the deployed configuration of the roof rack assembly to be customized to the dimensions of each particular cargo load. The biasing member lowers the force necessary to deploy the support modules, but is selected so that it does not provide so much biasing force that the support module is difficult to move to the collapsed position.

The above features and advantages and other features and advantages of the present invention are readily apparent from the following detailed description of the best modes for carrying out the invention when taken in connection with the accompanying drawings.

DETAILED DESCRIPTION

Figure 1:
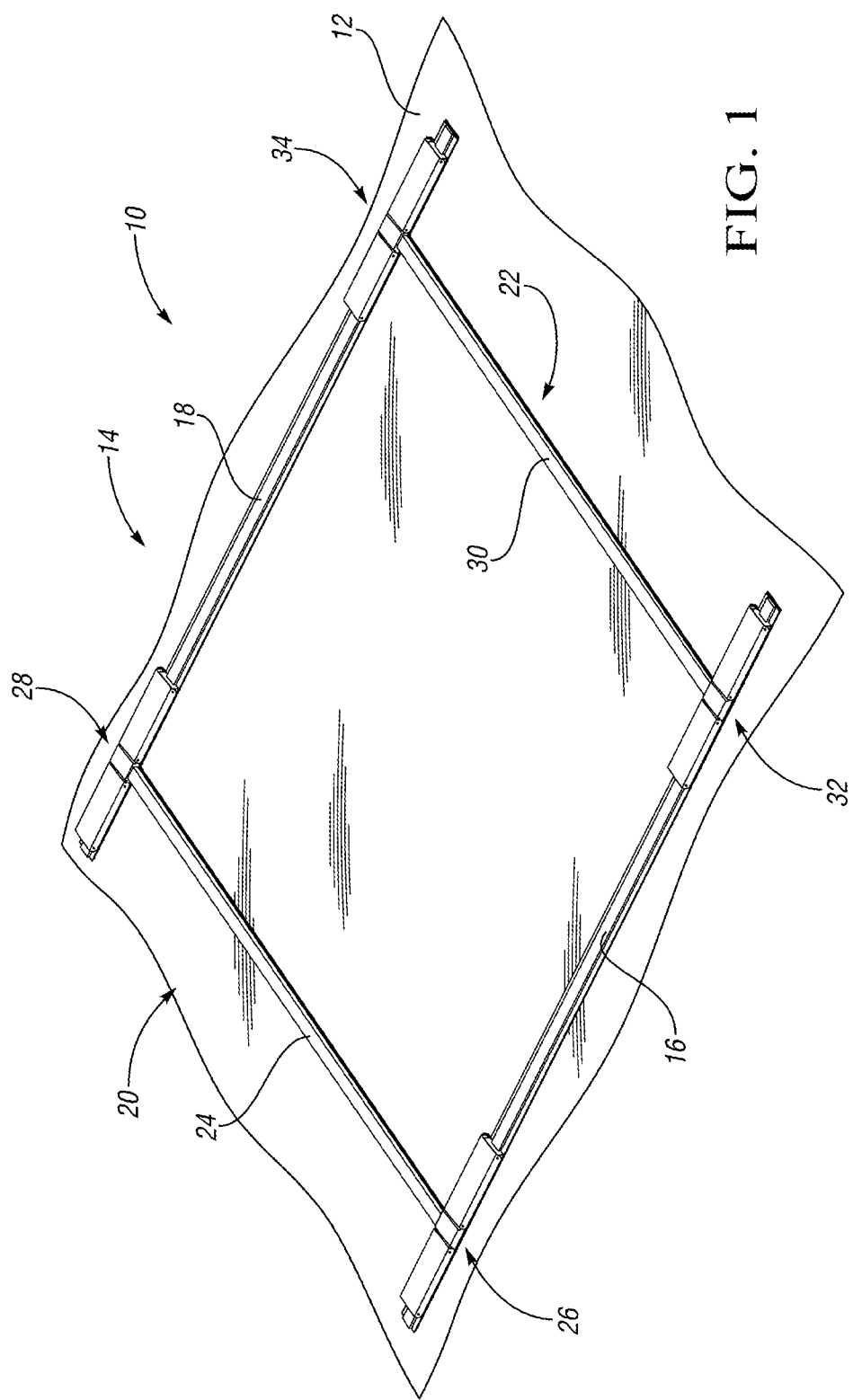
FIG. 1 is a schematic perspective illustration of a vehicle roof with a roof rack system having support modules and cross members in a collapsed position.

Referring to the drawings, wherein like reference numbers refer to like components, FIG. 1 shows a portion of a vehicle 10 having a roof 12 with a roof rack system 14. The roof rack system 14 includes first and second longitudinal tracks 16, 18 that are mounted to the roof 12 to extend generally longitudinally on the vehicle 10. The roof rack system 14 includes a first roof rack assembly 20 and a second roof rack assembly 22.

The first roof rack assembly 20 includes a first cross member 24 that is configured to extend lengthwise between the longitudinal tracks 16, 18. The first roof rack assembly 20 also includes a first support module 26 and a second support module 28. The first support module 26 is connected to the first longitudinal track 16 and the second support module 28 is connected to the second longitudinal track 18, as further described below. The cross member 24 is connected to the first and second support modules 26, 28 and thereby operatively connected to the longitudinal tracks 16, 18 as further described below.

The second roof rack assembly 22 includes a second cross member 30 that is configured to extend lengthwise between the longitudinal tracks 16, 18. The second roof rack assembly 22 also includes a respective first support module 32 and a second support module 34. The first support module 32 is connected to the first longitudinal track 16 and the second support module 34 is connected to the second longitudinal track 18, as further described below. The cross member 30 is connected to the first and second support modules 32, 34 and thereby operatively connected to the longitudinal tracks 16, 18 as further described below.

Figure 2:
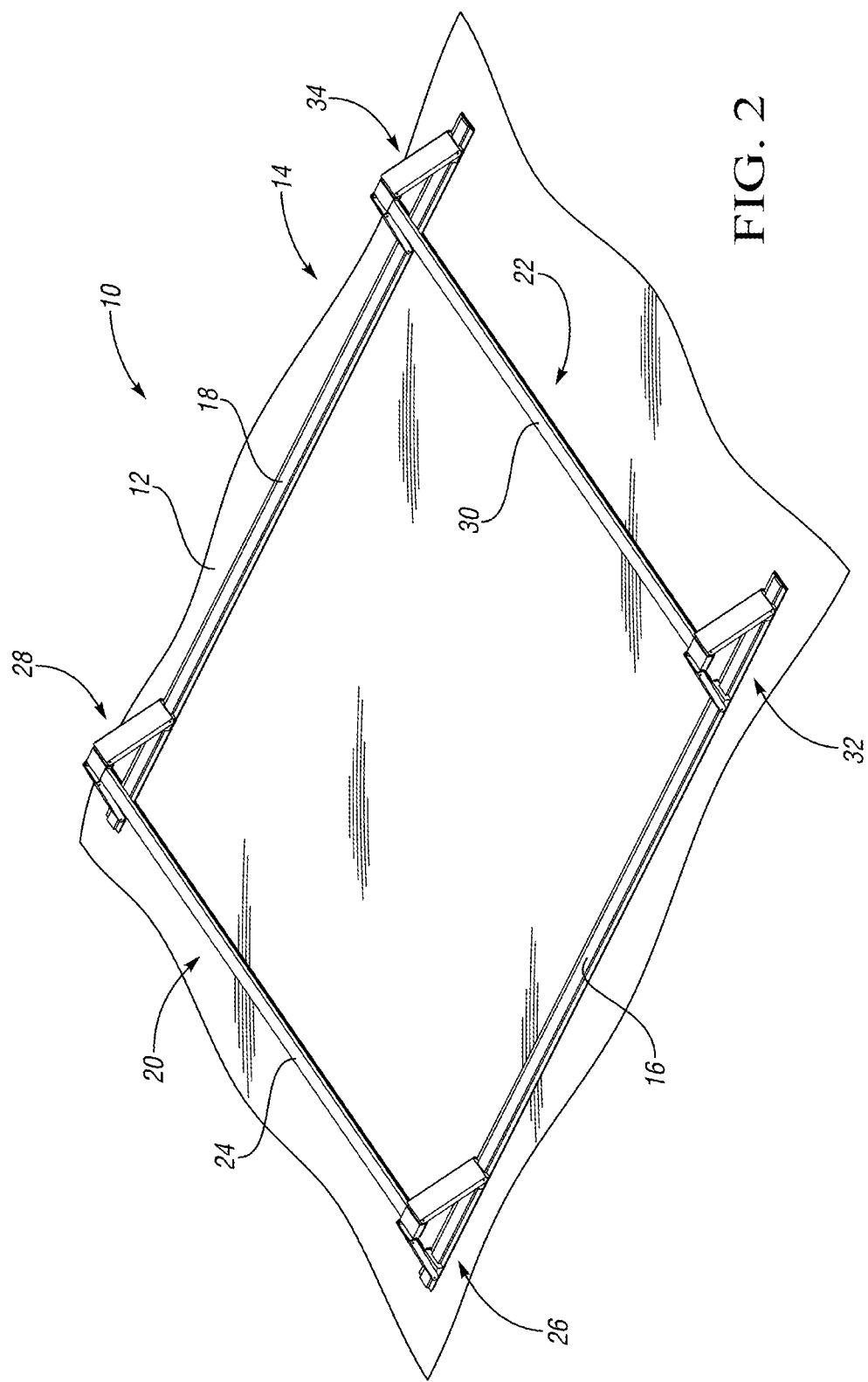
FIG. 2 is a schematic perspective illustration of the vehicle roof and roof rack system of FIG. 1 with the support modules and cross members in a deployed position.

Each of the support modules 26, 28 establishes a four bar linkage with the cross member 24, as described below. Each of the support modules 32, 34 establishes a four bar linkage with the cross member 30 in an identical manner. The first and second roof rack assemblies 20, 22 are movable between a first position, referred to as a collapsed position, shown in FIG. 1, and a second position, referred to as a deployed position, shown in FIG. 2. In the deployed position, the cross members 24, 30 move vertically away from the roof 12.

Figure 3:
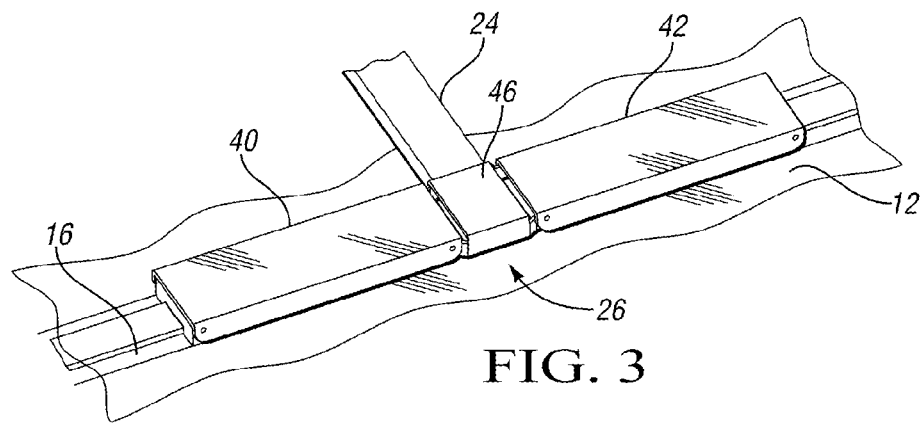
FIG. 3 is a schematic perspective illustration in fragmentary view of one of the support modules and cross members in a collapsed position.
Figure 4:
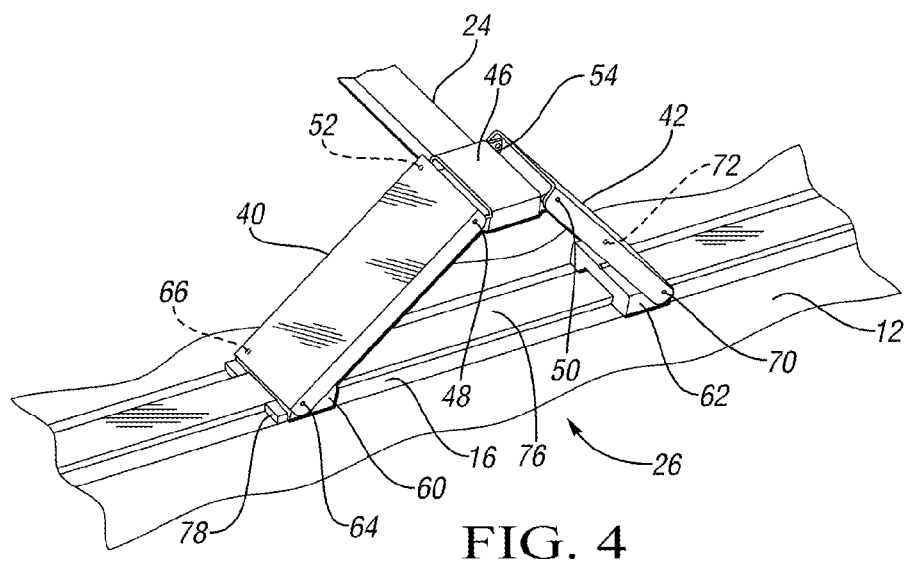
FIG. 4 is a schematic perspective illustration in fragmentary view of the support module and cross member of FIG. 3 in a deployed position.

FIGS. 3 and 4 show one of the support modules 26 in the collapsed position and the deployed position, respectively. Each of the other support modules 28, 32, 34 is configured substantially identically to the support module 26; accordingly, the description of support module 26 applies equally to support modules 28, 32, 34. The support module 26 includes a first support arm 40 and a second support arm 42, both of which are hinged to an end portion 46 of the cross member 24 at respective pivot points 48, 50, 52, 54, so that the support arms are pivotably connected to the cross member 24. The end portion 46 may be a unitarily formed with the remainder of the cross member 24 or may be separately formed and rigidly connected to the remainder of the cross member 24.

The support module 26 includes a first sliding track 60 hinged to the first support arm 40 at pivot points 64, 66 so that the first sliding track 60 is pivotably connected to the support arm 40. A similar second sliding track 62 is hinged to the second support arm 42 at pivot points 70, 72 so that the second sliding track 62 is pivotably connected to the support arm 42. Each of the sliding tracks 60, 62 has a slot or recess 74 (shown in FIGS. 5-7) that is captured on a ledge 76 formed by the track 16 and is configured to slide on the track 16 along the ledge 76. Optionally, the track 16 may have a stop 78 that prevents further sliding movement of the support assembly module 26. In FIG. 4, the sliding track 60 is prevented from sliding further to the left along track 16 by the stop 78. In some embodiments, one of the sliding tracks 60, 62 could instead by fixed on the track 16 with only the other of the sliding tracks 60, 62 being slidable. Once in the deployed position, the support module 26 may be manually slid fore or aft along the track 16 to adjust the fore/aft position of the support module on the roof 12 and the relative position of the roof rack assemblies 20, 22. Stops similar to stop 78 may be placed in predetermined locations on the tracks 16, 18 to limit the range of the fore/aft movement. Locking clamps may also be provided to lock each sliding track 60, 62 to a final fore/aft position on the sliding track 16 when the module 26 is in the deployed position.

Figure 9:
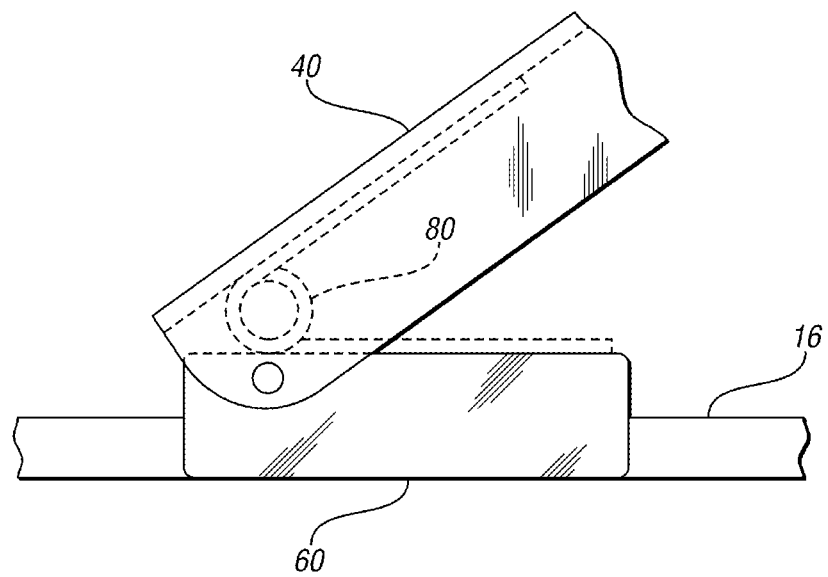
FIG. 9 is a schematic fragmentary side view of the support module of FIGS. 3-8 showing a biasing member between the support arm and a sliding track.

The support module 26 has a biasing member 80, shown in FIG. 9, which in this embodiment is a torsion spring. The biasing member 80 is connected with one end to the sliding track 60 and at another end to an underside of the support arm 40. The biasing member 80 biases the support arm 40 away from the sliding track 60, and so urges the support module 26 to the deployed position. The force of the biasing member 80 may be selected so that the biasing member 80 provides some assistance in moving the support module 26 to the deployed position, but is small enough so that only a manageable amount of force is required by an operator to overcome the biasing member 80 when manually pressing the cross member 24 downward to return the support module 26 to the collapsed position. In other embodiments, the biasing member 80 may instead be a compression spring connected between the support arm 40 and the sliding track 60, or a tension spring connected between the sliding track 60 and the sliding track 62.

Moving the support module 26 from the deployed position to the collapsed position causes the sliding tracks 60, 62 to slide apart from one another. In the collapsed position of FIG. 3, the cross member 24 is relatively level or flush with the support arms 40, 42 and the sliding track 16. In the deployed position of FIG. 4, the cross member 24 is raised further from the roof 12 than in the collapsed position.

Figure 5:
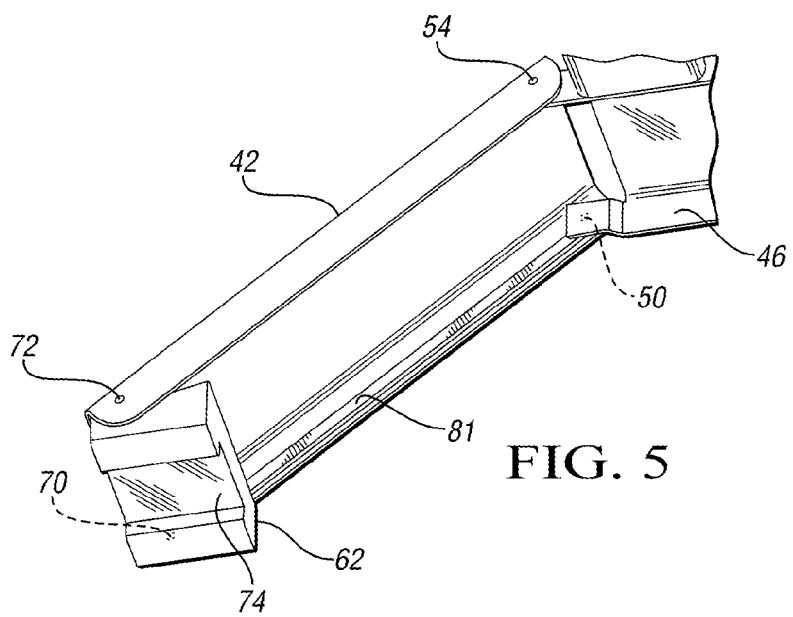
FIG. 5 is a schematic perspective fragmentary view of the support module of FIG. 4.
Figure 6:
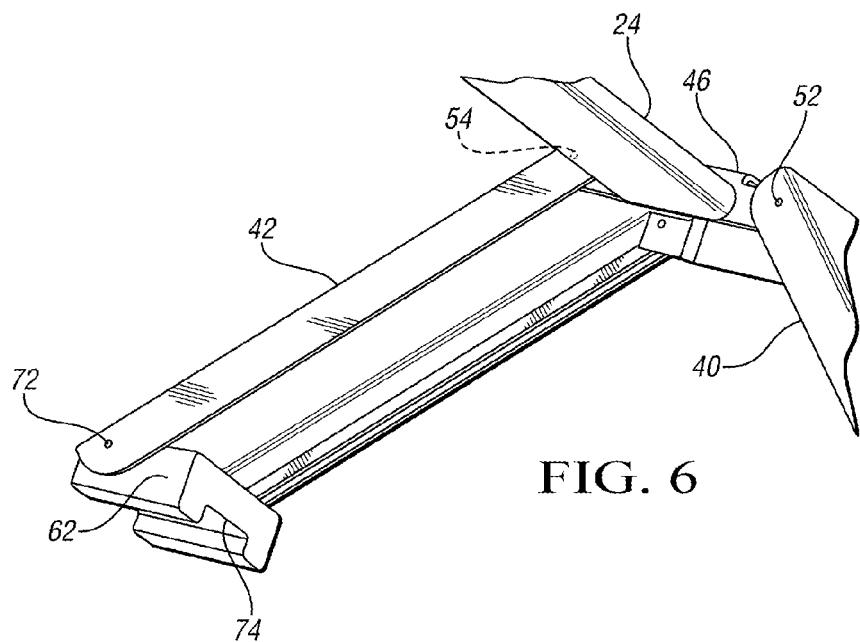
FIG. 6 is a schematic perspective fragmentary view of the support module of FIGS. 4-5.
Figure 7:
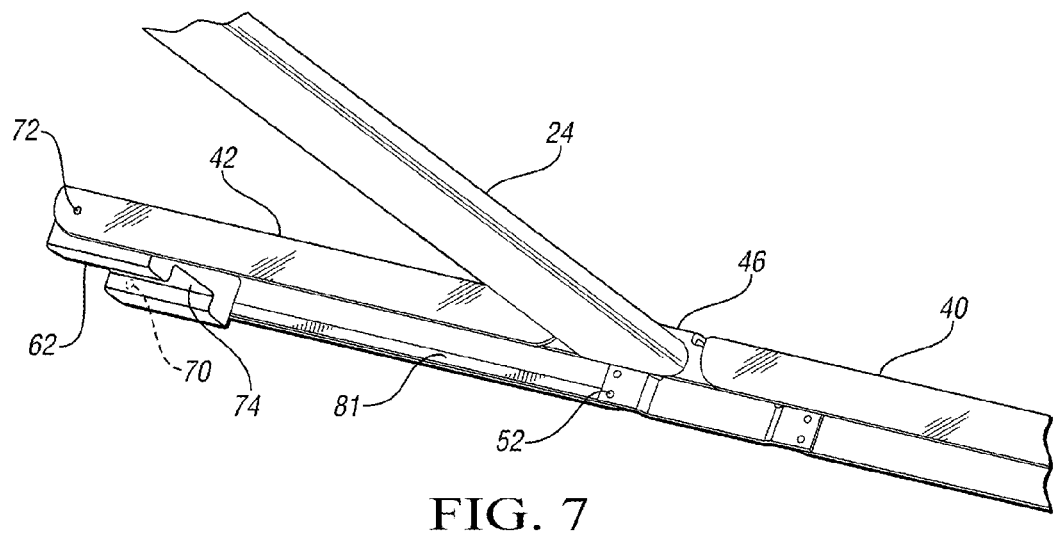
FIG. 7 is a schematic perspective fragmentary view of the support module of FIGS. 3-6 in a deployed position.

The support module 26 establishes a four bar linkage with the cross member 24. The support arms 40, 42, the end portion 46, and the track 16 are the four links of the four bar linkage, with the sliding tracks 60, 62 allowing the effective length of the link established by the track 16 to vary. Referring to FIGS. 5 and 7, a support bar 81 is added between the pivot points 50, 70 of the support arm 40 to further stabilize the support arm 40.

Figure 8:
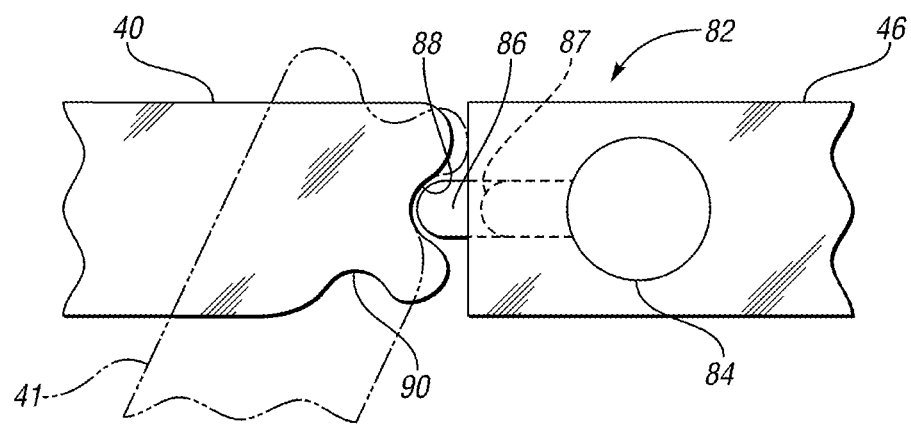
FIG. 8 is a schematic fragmentary side view of a locking mechanism locking one of the support arms of the support module of FIGS. 3-7 in the collapsed position and, in phantom, showing the support arm locked in the deployed position.

The support module 26 also has a releasable locking mechanism 82 shown in FIG. 8. The locking mechanism 82 includes a depressible button 84 mounted to the side of the end portion 46 of the cross member 24. Pressing the button 84 toggles a latch member 86 between a withdrawn position, shown in phantom at 87, and a locked position, shown with solid lines. When the support module 26 is in the collapsed position, the latch member 86 is in a first notch 88 of the support arm 40, and the support arm 40 is locked substantially flush with the cross member 24. To move the support module 26 to the deployed position, the button 84 is depressed, which withdraws the latch member 86 from the first notch 88. This allows the spring force of the biasing member 80 to urge the support module 26 at least partially toward the deployed position (with the position of the support arm 40 in the deployed position illustrated in phantom at 41), lifting the cross member 24 and causing the sliding tracks 60, 62 to move toward one another. In the deployed position, the support arm 40 is positioned such that a second notch 90 of the support arm 40 is aligned with the latch member 86. The button 84 is released so that the latch member 86 moves into the notch 90 to lock the support arm 40 and the support module 26 in the deployed position. A cable may be used to connect the button 84 with a latch member on the support module 28 on the opposite end of the cross member 24, so that the button can be operated to cause the latch member to move in and out of substantially identical notches in the support arm of the support module 28. Some vehicle seats have similar toggle release buttons connected with a cable to a lock on an opposite end of the seat.

Manual force may be added to move the support module 26 upward to the deployed position. Optionally, a damper may be added between the support arm 40 and the sliding track 60 adjacent the spring 80 to control the movement of the support module 26 between the collapsed position and the deployed position.

While the best modes for carrying out the invention have been described in detail, those familiar with the art to which this invention relates will recognize various alternative designs and embodiments for practicing the invention within the scope of the appended claims.

The invention claimed is:

1. A roof rack system for a vehicle roof comprising:
   first and second longitudinal tracks mountable to the roof substantially parallel to one another;
   first and second roof rack assemblies each having:
   a cross member configured to span between the longitudinal tracks; and
   first and second support modules operatively connecting the cross member to the first and second longitudinal tracks, respectively, such that each of the support modules establishes a four bar linkage with the cross member; wherein each of the support modules has first and second support arms pivotally connected to the cross member;
   a biasing member;
   a locking mechanism that is configured to lock one of the support arms to the cross member to hold the support modules in a collapsed position in which the cross member is substantially flush with the support modules, and is releasable to allow the biasing member to urge the support modules to a deployed position in which the cross member is spaced further above the longitudinal tracks than when in the collapsed position; wherein the support modules are slidable along the longitudinal tracks to adjust a fore-aft position of the cross member when in the deployed position;
   first and second sliding tracks pivotally connected to the respective first and second support arms and configured to be slidable along one of the longitudinal tracks;

wherein the biasing member is a torsion spring connected to one of the support arms and one of the sliding tracks and configured to bias said one of the support arms to pivot away from said one of the sliding tracks, thereby urging the cross member away from said one of the longitudinal tracks to the deployed position and causing the sliding tracks to slide toward one another;

wherein the locking mechanism includes a first notch and a second notch in one of the support arms and a selectively releasable latch member connected to the cross member; and wherein the latch member is in the first notch when the cross member is in the collapsed position and is in the second notch when the cross member is in the deployed position.

2. The roof rack system of claim 1, wherein at least one of the longitudinal tracks is configured with a stop that limits movement of the roof rack assemblies along the longitudinal tracks.

3. The roof rack system of claim 1, wherein the cross member is locked to said one of the support arms when the latch is in the first notch and when the latch is in the second notch.

4. A roof rack system for a vehicle roof comprising:
first and second longitudinal tracks mountable to the roof substantially parallel to one another;
first and second roof rack assemblies each having:
an elongated cross member configured to span between the tracks;
a first support module operatively connecting the cross member to the first longitudinal track;
a second support module operatively connecting the cross member to the second longitudinal track;
wherein each of the support modules includes:
first and second support arms pivotally connected to the cross member;
first and second sliding tracks pivotally connected to the first and second support arms, respectively, and configured to be slidable along the one of the first and second longitudinal tracks to which the support module is operatively connected;
a spring connected to the support module and configured to bias the support arms to pivot away from the sliding tracks;
a locking mechanism configured to lock the support arms and cross member in a first position in which the support arms and cross member are relatively flush with one another; wherein the locking mechanism is releasable to allow the spring to bias the support arms and cross member to a second position in which the cross member is further from the longitudinal tracks than in the first position; wherein the locking mechanism is further configured to lock the support arms and cross member in the second position;
wherein the locking mechanism includes a first notch and a second notch in one of the support arms and a selectively releasable latch member connected to the cross member; wherein the latch member is in the first notch when the cross member is in the first position and is in the second notch when the cross member is in the second position.

5. The roof rack system of claim 4, wherein at least one of the roof rack assemblies is movable fore and aft along the longitudinal tracks when the cross member is in the second position to adjust the relative position of the first and second roof rack assemblies.

6. The roof rack system of claim 4, wherein at least one of the longitudinal tracks is configured with a stop that limits movement of the roof rack assemblies along the longitudinal tracks.

7. A vehicle comprising:
a roof;
longitudinal tracks spaced parallel to one another and mounted to the roof;
a pair of roof rack assemblies each of which includes support modules and a cross member connected to the longitudinal tracks by the support modules to establish a four bar linkage; wherein the support modules are configured to allow the cross member to move between a collapsed position in which the cross member is generally flush with the support modules and a deployed position in which the cross member is raised further above the roof than in the collapsed position;
wherein each of the support modules includes first and second support arms pivotally connected to the cross member of the respective roof rack assembly, first and second sliding tracks pivotally connected to the respective first and second support arms and configured to be slidable along one of the longitudinal tracks, and a spring connected to the support module and configured to bias the support arms to pivot away from said one of the sliding tracks, thereby urging the cross member away from the longitudinal tracks;
a locking mechanism configured to lock the support arms to the cross member in both the collapsed and the deployed position; wherein the locking mechanism includes a first notch and a second notch in one of the support arms and a selectively releasable latch member connected to the cross member; wherein the latch member is in the first notch when the cross member is in the collapsed position and is in the second notch when the cross member is in the deployed position;
wherein the roof rack assemblies are configured to allow fore/aft adjustment of the cross member by sliding the support modules along the longitudinal tracks when the cross member is in the deployed position;
wherein the support arms and cross member are relatively flush with one another in the collapsed position; and wherein the locking mechanism is releasable to allow the spring to bias the support arms and cross member to the deployed position in which the cross member is further from the longitudinal tracks than in the collapsed position.

* * * * *